May 5, 1964  R. T. WINDSOR  3,131,953
VALVE AND MEANS FOR ATTACHING THE SAME TO A CONDUIT
Filed Nov. 30, 1961
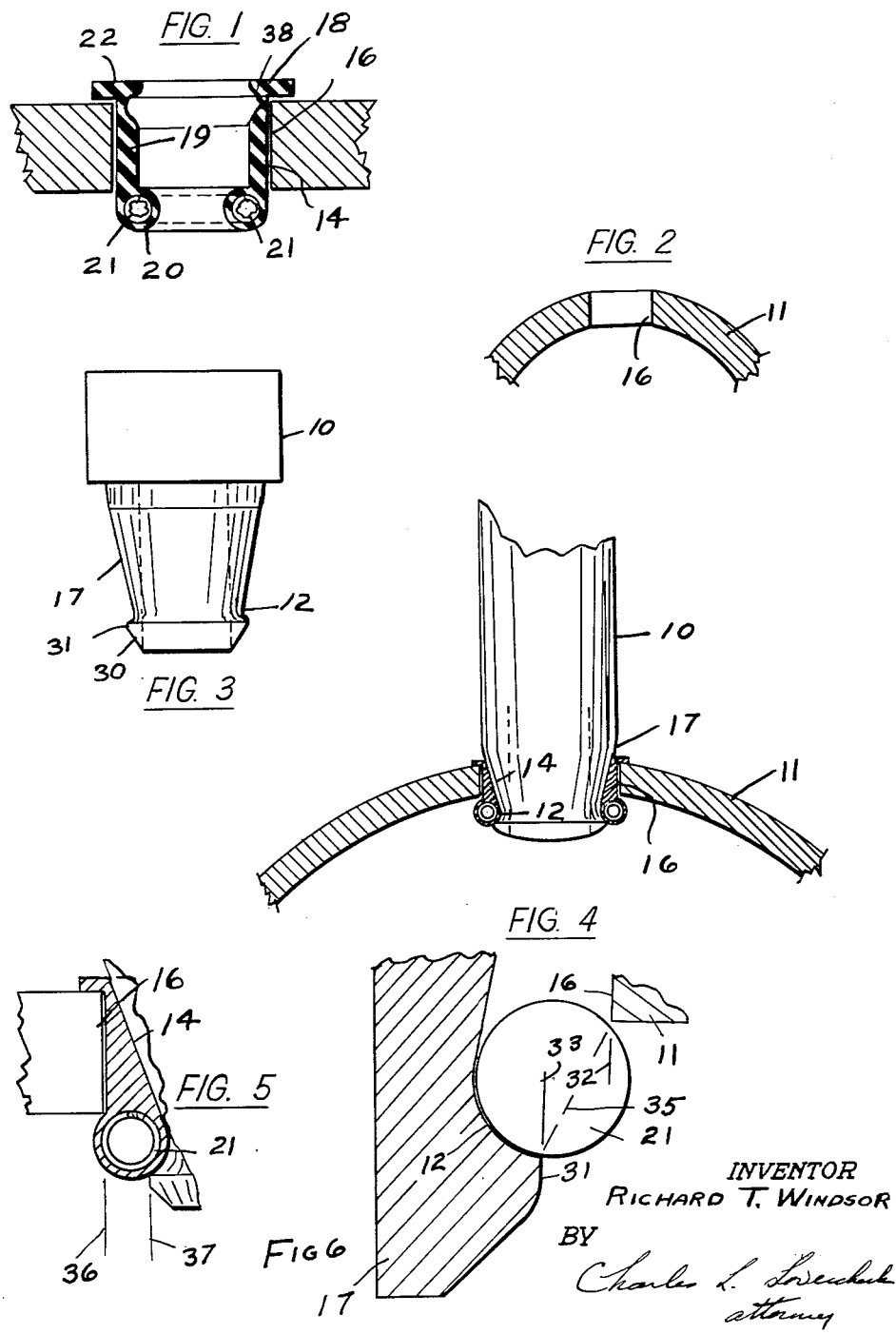

United States Patent Office 3,131,953
Patented May 5, 1964

3,131,953
VALVE AND MEANS FOR ATTACHING THE SAME TO A CONDUIT
Richard T. Windsor, Erie, Pa., assignor to Hays Manufacturing Company, Erie, Pa., a corporation of Pennsylvania
Filed Nov. 30, 1961, Ser. No. 156,050
7 Claims. (Cl. 285—189)

This invention relates to valves and, more particularly, to valves for tapping relatively large fluid pipe lines.

Connections to relatively large pipe lines such as water mains have usually been made by means of tapping machines which bore and thread an opening in the pipe and insert a threaded valve when the contents of the pipe are under pressure. This requires special complex equipment.

The present invention contemplates an attaching means for a valve which will not require the operation of threading the pipe and is suitable for use in pipes made of asbestos-cement; cast iron, ductile iron, steel, and other metallic pipes with or without various linings; and cement and other metallic pipes, some of which cannot be readily threaded.

It is accordingly, an object of the present invention to provide an improved means of attaching valves and other connections to a pipe line without requiring threading of the pipe line.

Another object of the invention is to provide an improved attaching means for connecting a branch line to a pipe line.

A further object of the invention is to provide a valve which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a cross sectional view of an improved attaching means for a valve according to the invention;

FIG. 2 is a cross sectional view of a pipe showing a smooth hole bored therein for receiving the valve;

FIG. 3 is a side view of a valve body according to the invention;

FIG. 4 is a view of the pipe and sleeve in cross section and the valve body in full lines inserted in a pipe;

FIG. 5 is a side view of a part of the connection inserted in a pipe; and

FIG. 6 is an enlarged schematic view of a part of the spring, valve body, and pipe.

Now with more specific reference to the drawing wherein like numerals refer to the same parts throughout the various views thereof, a valve body 10 is shown which may be part of a suitable corporation stop or the like which is to be connected to a pipe service line such as a main line 11. The valve body shown can also be considered to represent any suitable connection. The main line 11 may be made of steel, asbestos-cement, cast iron, or other metallic or non-metallic material. The line or pipe 11 has a smooth hole 16 bored therein. The hole may be bored with a suitable drilling machine if the pipe is under pressure. The valve body 10 or other connector is generally cylindrical with a tapered end portion 17 suitable to be received in an insert device 18.

The lower end of the frusto-conical tapered portion 17 merges into the base of a frusto-conical end 30 and forms an annular seat 12 for receiving a member 20. A flange 22 overlies the outside of the pipe and holds the device in position.

The sleeve or insert device 18 is made of rubber, plastic, or other elastomeric material having similar characteristics or the like and, in its undeflected condition as shown in FIG. 1, it has a generally cylindrical body 19 terminating at its lower end in the annular member 20. The member 20 has a cross sectional diameter greater than the wall thickness of the sleeve and it extends inwardly therefrom. The flange 22 extends outwardly at the upper end. The sleeve has a groove 38 which is complementary in shape to the outside of a flange 31 of the valve body 10.

Molded in the annular member 20 is an annular helical or torrodial spring 21 which is made of steel, bronze, or suitable elastic material and forms a continuous bracelet inside the annular member. Spaced elements in the form of arcs or spheres embedded in the rubber could be used.

To insert the valve body or other connection in the pipe a hole such as the hole 16 is bored in the pipe. The sleeve or insert device 18 is then inserted in the hole 16 as shown in FIG. 1. The hole will be of substantially the same size as the outside diameter of the cylindrical portion of the body of the sleeve. As the valve or other connection is forced through the sleeve, it will deflect the inner periphery of the sleeve to conform with the outer shape of the valve or other connection, be it tapered as shown in FIGS. 4 and 5 or not tapered but grooved as shown in FIGS. 7 and 8. The operator will continue to push the body 10 into the sleeve until the annular portion 20 of the sleeve with the spring 21 therein snaps into a groove 12. This will hold the valve body against removal. The groove 12 will be of substantially the same radius as the annular member 20.

Since the thickness of the helix of the spring 21 is greater than the difference between the diameter of the outer edge of the flange 31 and the diameter of the hole 16, the valve body 10 cannot be removed without shearing the spring 21 around its entire circumference. It will be seen that the radius of the hole 16 indicated at 32 is only slightly larger than the outside radius of the flange 31, the difference being indicated between lines 32 and 33 in FIG. 6. This difference should be less than the radius of the helix of spring 21. The helix should underlie the wall of the pipe enough that the line 35 joining the corner of the pipe and the outer edge of the groove 12 passes upstream from the center of the helix. Thus, the resultant forces of the internal fluid or gas pressure in the main pipe line tends at all times to seal the annular member 20 against the seat 12 and inner edge of the hole 16. The higher the internal pressure in the pipe, the tighter the resulting seal.

The tapered valve body extends into the sleeve in the pipe hole in such a manner that the resilient member is deformed into a wedge shape which will force the pressure in the pipe to increase the effectiveness of the seal since the pressure will tend to push the rubber into a decreasing space through which it cannot pass. The action then becomes similar to that of an O-ring under pressure. So long as the coefficient of friction between the materials is significant, the rubber sleeve forms a hydraulic seal as well as a locking device itself. The non-tapered valve or other connection with the grooves in its cylindrical surface extends into the resilient sleeve in the pipe hole in such a manner that it compresses the resilient member between itself and the wall of the pipe hole. The resilient material of the sleeve is thus forced to conform to the grooves in the body. This gives, in effect, a number of O-rings to seal against possible leakage and, in addition, greatly increases the coefficient of friction between the materials.

In using a machine to assemble the device on a pipe under pressure, the valve will be assembled to the mandrel in a suitable machine well known to those skilled in the art. The tapered portion 17 will be lubricated and the machine assembled to the pipe 11 and the hole drilled. The machine will then be properly indexed to insert the valve or start it into the hole. The jack screw on the machine will then be tightened until the valve bottoms on the pipe. The machine can then be removed and the valve is completely assembled.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a pipe having a relatively thick wall and a rubber sleeve for sealingly supporting a branch member communicating with the inside of said pipe adapted to have a valve on the outer end thereof, said sleeve in its unstressed condition being in the form of a cylinder having an outwardly extending flange on one end and an inwardly extending annular member on the other end, said annular member having a metallic torroidal spring molded therein, said branch member having a tapered end generally in the shape of the frustum of a cone having an annular groove around one end thereof, said sleeve being adapted to have inserted therein said branch member whereby said sleeve is distorted to conform to the outside surface of said tapered end and said annular member snaps into said groove whereby said flange overlies the outer surface of said pipe around a hole therein and said annular member underlies the inside thereof.

2. In combination, a pipe having a relatively thick wall and a rubber sleeve for sealingly supporting a branch member communicating with the inside of said pipe adapted to have a valve on the outer end thereof, said sleeve in its unstressed condition being in the form of a cylinder having an outwardly extending flange on one end and an inwardly extending annular member on the other end, said annular member having a metallic torroidal spring molded therein, said branch member being cylindrical, said sleeve being adapted to have inserted therein said branch member whereby said sleeve is distorted and said flange overlies the outer surface of said pipe around a hole therein and said annular member underlies the inside thereof.

3. In combination, a pipe and a connection member, said pipe having a hole in one wall thereof, a resilient sleeve in said hole, said connection member having a flange on its inside end, and a garter spring attached to the inside end of said sleeve, said garter spring being thicker than the difference in radius of said hole and said flange.

4. In combination, a pipe and a connection member, a hole in said pipe, a resilient sleeve in said hole, a flange on the end of said connection member, and rigid means on the end of said resilient sleeve, said rigid means being of greater width than the difference in radius of said hole and said flange whereby said rigid means is stressed in shear between said flange and said pipe around said hole when a force tending to remove said connection member is exerted thereon.

5. The combination recited in claim 4 wherein said connection member comprises a generally cylindrical body tapering toward the inside of said pipe.

6. In combination, a pipe and a connection member, said pipe having a hole in a wall thereof, a hollow cylindrical sleeve made of resilient material and having an outwardly directed flange on the inner end thereof underlying the outside wall of said pipe around said hole, a frusto-conical member made of rigid material received in said cylindrical sleeve, said frusto-conical member having an outwardly directed flange on its inner end defining a groove, and a helical shaped spring defining a loop and embedded in said resilient material, said spring in its free condition having an inside diameter less than the inside diameter of said sleeve, said spring and the resilient material of said cylindrical sleeve being deflected so that the inside of said cylindrical sleeve conforms to the outside surface of said frusto-conical member with said spring lying in said groove.

7. The combination recited in claim 6 wherein said cylindrical sleeve has an internal peripheral groove having a cross sectional shape similar to the cross sectional shape of said flange on said frusto-conical member.

References Cited in the file of this patent

UNITED STATES PATENTS

| | | |
|---|---|---|
| 1,986,447 | Rishel | Jan. 1, 1935 |
| 2,254,102 | Cruse | Aug. 26, 1941 |
| 2,495,615 | Clute | Jan. 24, 1950 |
| 2,543,909 | Hatheway | Mar. 6, 1951 |
| 2,566,502 | Smith | Sept. 4, 1951 |
| 2,823,724 | Gill | Feb. 18, 1958 |
| 2,951,714 | Carlberg | Sept. 6, 1960 |